United States Patent
Rozenstrauch et al.

[11] Patent Number: 5,530,908
[45] Date of Patent: Jun. 25, 1996

[54] APPARATUS FOR PROVIDING FAULT TOLERANCE IN A RADIO COMMUNICATION SYSTEM

[75] Inventors: Alexander Rozenstrauch, Buffalo Grove; Paul M. Erickson, Palatine, both of Ill.

[73] Assignee: Motorola, Inc., Schaumburg, Ill.

[21] Appl. No.: 904,722

[22] Filed: Jun. 26, 1992

[51] Int. Cl.$^6$ .................................................. H04B 17/02
[52] U.S. Cl. ............................ 455/8; 455/53.1; 371/20.1
[58] Field of Search ........................ 455/8, 9, 53.1, 455/56.1, 67.1, 133; 375/3; 370/15, 16; 371/8.1, 9.1, 8.2; 364/228, 228.1

[56] References Cited

U.S. PATENT DOCUMENTS

| | | | |
|---|---|---|---|
| 3,870,824 | 3/1975 | Baichtal et al. | 371/8.2 X |
| 4,775,976 | 10/1988 | Yokoyama | 371/8.2 X |
| 4,949,340 | 8/1990 | Smith et al. | 370/16 X |
| 4,974,144 | 11/1990 | Long et al. | 371/8.2 X |
| 4,985,904 | 1/1991 | Ogawara et al. | 455/8 X |
| 5,115,449 | 5/1992 | Lockyer et al. | 455/8 |
| 5,202,980 | 4/1993 | Morita et al. | 371/9.1 X |
| 5,271,023 | 12/1993 | Norman | 371/9.1 X |
| 5,428,783 | 6/1995 | Lake | 395/650 |

*Primary Examiner*—Edward F. Urban
*Attorney, Agent, or Firm*—James A. Coffing

[57] ABSTRACT

A radio communication system controller (100) includes a first (103) and second (104) processor for processing input communication messages (101) used in a radio communication system. The controller (100) further includes shared memory (105), which memory is accessible to each of the first (103) and second (104) processors, for storing the input communication messages (101). The controller (100) is further equipped with fault detection capability (107) for determining (402) when a processing fault has occurred.

10 Claims, 2 Drawing Sheets

APPARATUS FOR PROVIDING FAULT TOLERANCE IN A RADIO COMMUNICATION SYSTEM

FIELD OF THE INVENTION

The invention relates generally to radio communication systems, and particularly to such systems which require fault tolerance computing in order to maintain system performance requirements.

BACKGROUND OF THE INVENTION

Radio frequency (RF) trunked communications systems are well-known in the art. Such systems use one or more system controllers to allocate communication resources (e.g., channels) among subscribers throughout the system. Accordingly, a reliable, computer based system architecture is required to maintain system performance and provide real time fault tolerance.

Fault tolerance can be achieved using one or more fundamental hardware architectures. Such architectures include, but are not limited to, systems employing: i) hot-standbys with voting, and ii) dynamic redundancy. Additionally, fault tolerance software techniques for supporting these architectures include: i) N-version programming, and ii) check-pointing (i.e. through use of recovery blocks). Unfortunately, each of the foregoing methodologies is inadequate for meeting the rigorous requirements of today's radio communication systems. These shortcomings are illustrated in the following discussion of each A hot-standby system with voting typically utilizes multiple processors, such as a microprocessor or the like, and an arbitrator. Each processor, while processing identical system inputs in parallel with each other, provides input to the arbitrator. The arbitrator might then elect the proper output based on the inputs provided (e.g., by comparing the respective outputs of the three microprocessors, and selecting that output which is identical to at least one other output). The problem with the foregoing approach is the requirement for additional hardware (i.e., two extra processors, in addition to the arbitrator hardware). Further, voting schemes typically do not isolate the location of a real-time fault, as any one of the processor outputs may be invalid at a given time. That is, the occurrence of an intermittent fault may go undetected until the individual outputs are sampled for validity. The extra step of sampling the outputs represents an inefficient method of obtaining fault tolerance, particularly where system up-time is critical, as in a radio communication system that might be providing emergency service communication..

Dynamic redundancy systems typically include a dual microprocessor arrangement, where both processors are processing inputs, or stimulus, while only one processor (i.e., the so-called active processor) generates an output, or response. This arrangement, while an improvement over a single, non-redundant microprocessor scheme, still has significant limitations which need to be overcome to make it suitable for use in a real-time communication system. In particular, problems of synchronizing information between the two processors, as well as the time required to detect failure of the active processor, are but a few of the notable shortcomings of such a system. Of course, the potential loss of information, and an undesirable time delay associated with switch-over after a fault is detected, make this approach impractical to use in a radio communication system.

As with any computer-based system, the hardware components perform tasks in response to software instructions. It should be noted that the foregoing hardware architectures are typically supported by one of two software (i.e., programming) methods: 1) N-version programming, or 2) check-point programming.

An N-version programming method can be defined as N independently programmed, but functionally equivalent, programs operating concurrently. For example, in a two-processor arrangement, there exists two separate operating systems, each providing directives to one of the processors. This approach, however, has a disadvantage in that the software development required is increased by a factor of N. Of course, as N increases, the software development costs increase, thereby making this approach an even less desirable alternative By contrast, check-point programming involves a technique under which a primary task is divided into blocks, the end of which each constitute a so-called check point. During normal system operation, these blocks are executed and the process state is saved at each check point. In the event of a task failure, the failed task can be re-executed from the last check point. That is, by retrieving the recorded process state data from the last check point, the system is able to service the fault and continue processing. While check pointing provides a marginal improvement over the N-version programming approach, it still does not provide adequate fault recovery for a real time system. In particular, the efficiency of the system is directly proportional to the frequency of check point operations. That is, for a check point system to be truly fault tolerant (i.e., where faults are virtually transparent to the user, and time delays minimal) there would have to be a large number of check points. Of course, storing process data consumes otherwise available processor time. For this reason, such a system could not be efficiently employed as a radio communication system controller.

Accordingly, there exists a need for a radio communications system controller which, through limited hardware and software redundancy, provides a continuous, real time output. This output should be reliable throughout normal system operation, and should, through fault detection logic, maintain a smooth transition between the primary and auxiliary processing units.

DETAILED DESCRIPTION OF A PREFERRED EMBODIMENT

The present invention encompasses a cost effective implementation of a fault tolerant controller for a radio communication system. In a preferred embodiment, the controller utilizes two versa-module European (VME) computers which are able to maintain real-time current process information after fault detection using a shared memory resource. This resource is accessed in a mutually exclusive manner, both during normal processing and during switch-over to an auxiliary (i.e., redundant) processor. The present invention might be employed in a radio communication controller by providing two processing units, (e.g., Motorola Smartnet™ Central Site Controller (CSC)), together with switching logic for coupling one or the other to other non-redundant system components, as herein described.

Figure 1:
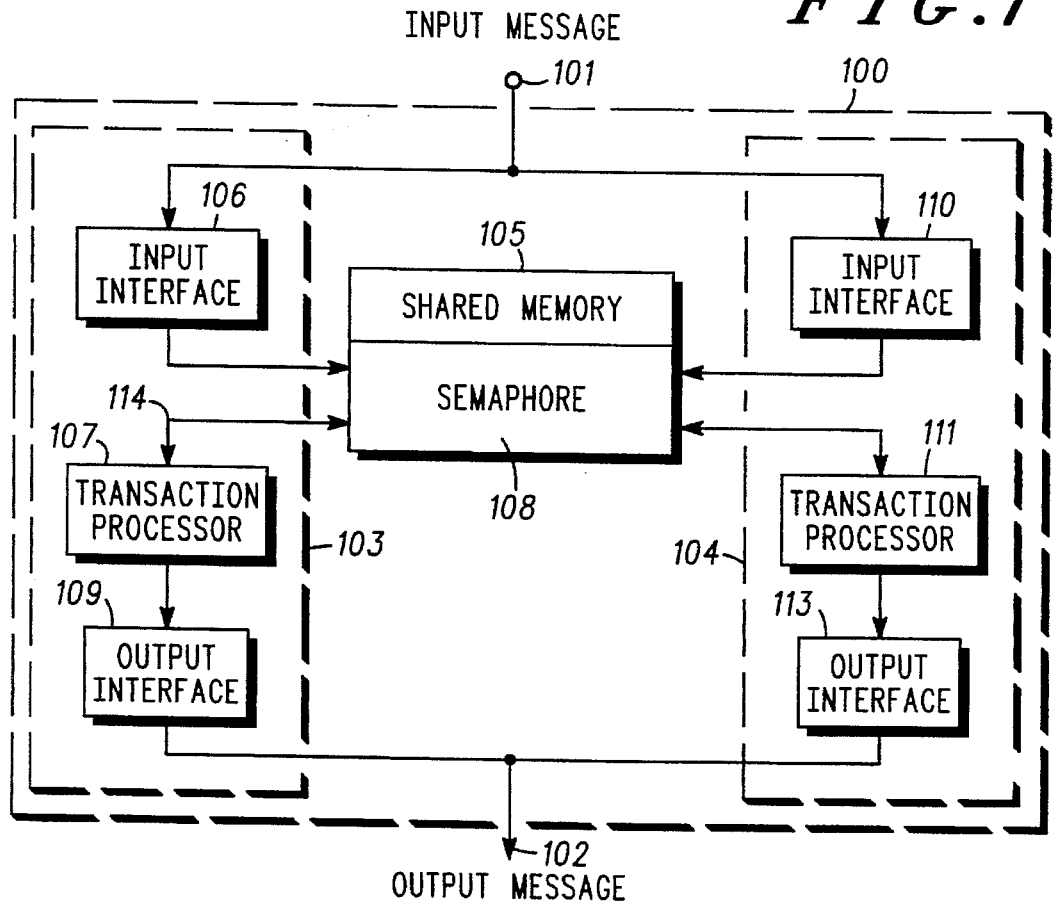
FIG. 1 shows a simplified block diagram of a radio system controller, in accordance with the present invention.

FIG. 1 shows a fault tolerant radio communication system controller 100 which is able to maintain its current process state in the event of a failure. That is controller 100 is able to switch between parallel processes, while maintaining current calls in progress, after a primary processor experiences a fault. Controller 100 receives information from the rest of the radio communication system in the form of input messages 101 and produces information for the rest of the system in the form of output messages 102. An example of an input message might be a request for a talk group call; while an example of an output message might be a channel grant for placing that call. Input messages 101 and output messages 102 are shown in FIG. 1 as separate entities, but might be coupled together via a duplex, or half-duplex, communication link. This arrangement is commonly employed, for example, in a so-called Ethernet™ link (i.e., IEEE 802.3 Local Area Network (LAN).

Controller 100 includes two identical processors 103, 104, each being connected to shared memory 105. In a preferred embodiment, input messages 101 arrive at both processors substantially simultaneously. Processors 103, 104 could be any of a wide variety of computers, but in the preferred embodiment are two Delta Series computers (i.e., based on the Motorola MC68000 family of microprocessors and the VMEbus standard). Likewise, the shared memory could be of any type compatible with the selected processor, but a preferred implementation employs reflective memory available from SYSTRAN Corporation as part of the so-called SCRAMNet™ Network. It should be noted that the selection of processor (103, 104) and shared, or reflective, memory (105) should be made to provide electrical isolation between the two processors, such that electrical faults within one processor will not affect the other. Processors 103, 104 are configured to arbitrate among themselves, as later described, for the right to enter input message 101 into shared memory 105, and for the right to generate output messages 102. Processors 103, 104 thereby provide substantially concurrent processing on input messages 101 in order to enter it into shared memory 105. Once an input message 101 is effectively stored in shared memory 105, processors 103, 104 will undergo substantially concurrent processing to provide a valid output. Of course, only one of the processors (103 or 104) will write a given message to shared memory, and only one will provide the requisite output messages. In a preferred embodiment, the arbitration schemes used to determine which processor writes input messages 101 to shared memory 105, and which provides output messages 102 are substantially different, and hence are described separately.

For purposes of further describing the components of processors 103, 104, a single processor (103) will be described, as both processors are identical in this regard. Processor 103 includes input interface 106 which receives input messages 101 and manipulates a so-called semaphore to gain exclusive access to a designated area of shared memory 105. Once exclusive access has been achieved, input interface 106 determines if input message 101 has already been stored, and if not, writes the input communication message to the shared memory. In a preferred embodiment, input interfaces 106, 110 each comprise hardware (e.g., Motorola VME 167 single board computer) together with software. Semaphore 108 resides in a predetermined storage location of shared memory 105, and provides for mutually exclusive access to shared memory 105 by input interfaces 106, 110 and transaction processors 107, 111. Once it has exclusive use of shared memory 105, input interface 106 searches a linked list stored in shared memory 105, to determine whether the current input message is presently stored in shared memory (i.e., having already been written by the other processor). If not, the input interface (with exclusive use) would append the current input message to the end of the linked list. Subsequently, shared memory 105 is released by the input interface by modifying semaphore 108 in a predetermined fashion.

Processor 103 further includes output interface 109, which provides output messages 102, when enabled. As described earlier, output messages 102 simply represent a response to input message, and may take the form of a channel assignment, busy indication, etc.

Lastly, processor 103 includes transaction processor 107, which operates on the messages stored in shared memory 105. While transaction processor 107 is capable of directly reading input message 102 from the linked list, a preferred embodiment requires that transaction processor 107 remove the message from the linked list only after providing an output to output interface 109. Upon completion access of this task, transaction processor 107 then gains exclusive access to the linked list, via semaphore 108. Since transaction processor 107 can read the linked list as well as modify it by removing items, transaction processor 107 requires a bi-directional link 114 to shared memory 105, as shown.

Transaction processors 107, 111 additionally include fault detection capability, which capability is well known in the art. In a preferred embodiment, a fault is said to have occurred when either processor (103 or 104) fails to produce an output message 102 from input message 101 within a predetermined time. Transaction processors 107 and 111 each use shared memory 105, as later described, to detect a fault on the opposing processor, thereby determining which unit is presently providing output messages 102 (i.e. which processor is enabled). It should be noted that, though the foregoing description, as well as a preferred embodiment, involves a two-processor arrangement, it is recognized that alternate embodiments might employ more processors.

Figure 2:
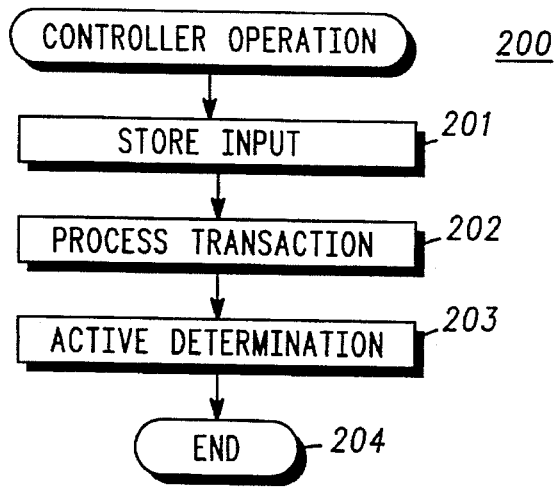
FIG. 2 shows a simplified flow diagram depicting the controller operation, in accordance with a preferred embodiment of the present invention.

FIG. 2 shows a simplified flow diagram 200 depicting the operation of a radio system controller, as it might be embodied in processors 103, 104. Upon receipt of an input message, the input is stored (201) in the shared memory. (Note that process 201 is responsible for arbitrating the mutually exclusive use of the input message storage area of shared memory, storing the message only if not already present, as later described.) Having successfully stored the message, the controller then processes (202) the transaction. That is, the controller determines an appropriate response (i.e., output message) for the received stimulus (i.e., input message). As an example of such a transaction, the controller might produce a channel grant for talk-group activity in response to a channel request (which request has been stored in shared memory). Having determined an appropriate response, the controller then determines (203) which of the two processors is active, before the routine is exited (204). In addition to fault detection, the foregoing determination routine is necessary to ensure that the output is correctly produced, and allows the input message to be removed from the linked list (recall that only the active processor is able to do this). Active determination is also responsible for fault detection and the change of status of which processor is the one enabled to write the output.

Figure 3:
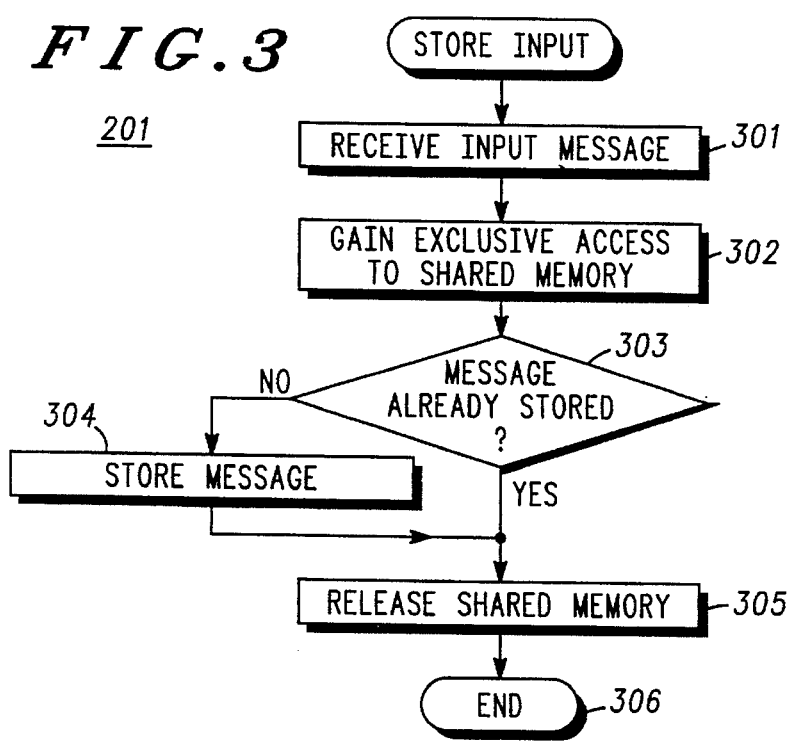
FIG. 3 shows a detailed flow diagram depicting one of the functional steps shown in FIG. 2, in accordance with the invention.

FIG. 3 shows a detailed flow diagram depicting the store input process (201) shown in FIG. 2. After an input message is received (301), the active processor (which is determined using process 203, as later described) attempts to gain (302) exclusive access to shared memory. This is accomplished using a storage location in shared memory, commonly referred to as a semaphore, to prohibit access to the input message storage area by other processors. A preferred embodiment utilizes a semaphore which provides for an inseparable read-modify-write memory operation. For example, a processor instruction "add one to a particular memory location" provides that one processor read the location, modify the contents by adding one, and write the modified contents back to the memory location, while preventing other processors from reading from, or writing to, memory. This approach represents but a sampling of the many available semaphore techniques which can be employed pursuant to this invention.

Once exclusive access is achieved, a decision (303) is reached to determine whether or not the current message has already been stored in shared memory. Again, there are many possible implementations, but a preferred embodiment provides that the controller scan the input message area, comparing some predetermined field of the current input message (e.g., call identifier) with each of the stored messages. If the current message has not yet been stored, the input message is stored (304) in shared memory, before releasing (305) the shared memory (modifying the semaphore). In a preferred embodiment, the store operation involves adding the current message to the tail of a linked list, and the memory is released by subtracting one from the predetermined semaphore memory location. By contrast, if the message has already been stored, the shared memory is released (305) and the routine is exited (306).

Figure 4:
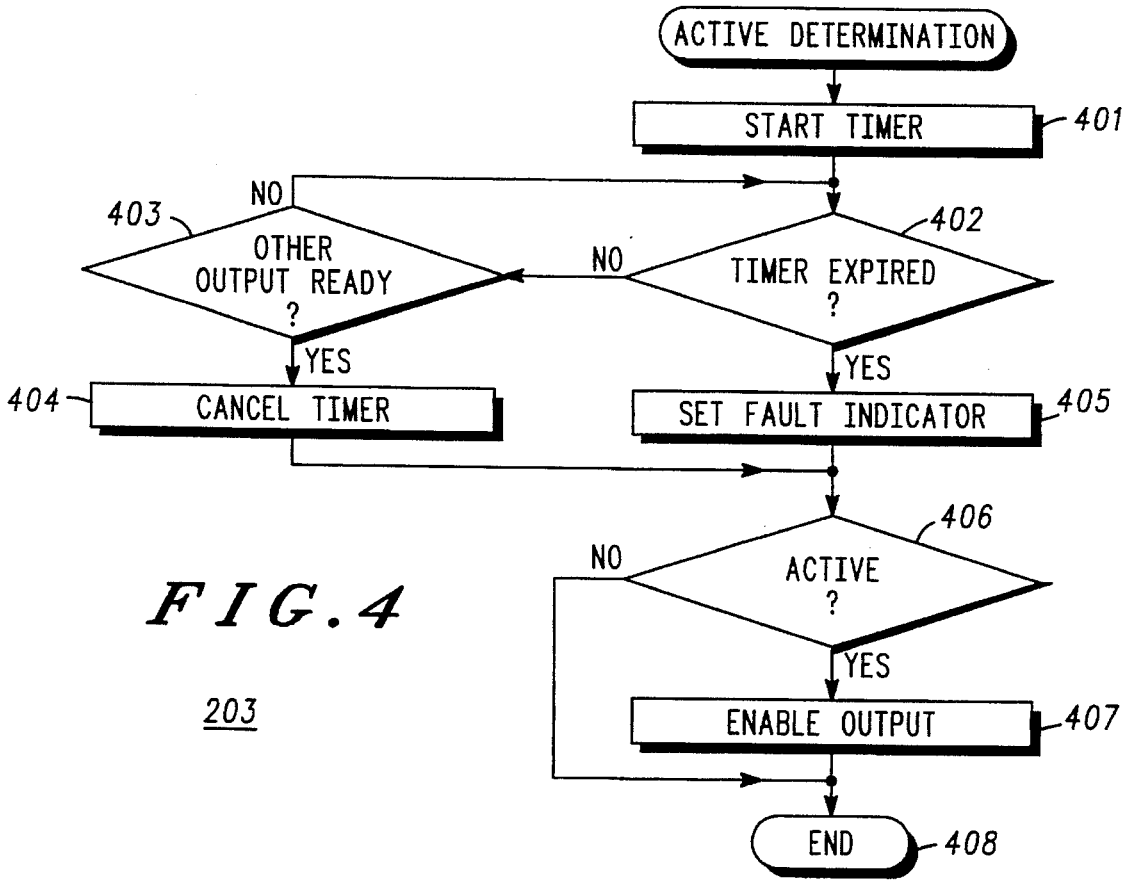
FIG. 4 shows a detailed flow diagram depicting another of the functional steps shown in FIG. 2, in accordance with the invention.

FIG. 4 shows a detailed flow diagram depicting the active determination process (203) shown in FIG. 2, which process is executed by each of the processors in the system. In general, this routine is used to provide fault detection, modify which processor is presently providing the output messages (active), and, based on the active status, determine whether or not to enable the output message operation. After the transaction has been processed, a timer is started (401), which timer value represents an interval during which a properly operating processor is capable of producing an output. In a preferred embodiment, the "timer" is represented by an operating system call which returns a predetermined message after the specified time (i.e., timer value). If the timer has not expired (e.g., no return message), the processors check (403) to see if another (or, in a preferred embodiment, the only other) processor's output is ready. This loop continues until either the timer expires (e.g., message returned), or another processor's output is ready. Expiration of the timer indicates a fault in one of the processors (e.g., not producing processed transactions), hence the fault indicator is set (405). The processor then attempts to determine (406) whether or not it has active status, as later described.

By contrast, if another processor's output is ready (403) before the timer expires, which case represents the normal sequence when all (e.g., both) processors are healthy, the timer is cancelled (404). A decision (406) is then reached to determine whether or not the processor has active status, e.g., as defined by a predetermined value being present in a predetermined memory location. If the processor determines (e.g., by examining the predetermined memory location) that it is not the active processor, the routine is exited (408). If however, the indication is that the processor is the active one, the processors output is enabled (407), which allows the processed transaction results to flow to the output message channel (102 shown in FIG. 1). It should be noted that at this time, the input message is removed from the input message linked list in shared memory, so that the same input is not processed twice.

Thus, the present invention allows for an implementation of a radio communication system controller which uses general purpose computers coupled together using a commercially available shared memory. Each processor is able to operate under a readily available operating system, and fault tolerance is achieved with minimum impact on application software development. Additionally, time delays after a fault are substantially reduced, thus providing real-time outputs (i.e., without loss of current processing activity).

What is claimed is:

1. A fault tolerant radio communication system controller, comprising:

a) first processing means for processing an input communication message used in a radio communication system;

b) second processing means for providing substantially concurrent processing of the input communication message processed by the first processing means;

c) shared memory means, coupled to each of the first and second processing means, for storing the input communication message to produce stored communication messages;

d) transaction processor means, coupled to at least the shared memory means, for detecting a processing fault, and for selectively enabling an output message resulting from the substantially concurrent processing of the input communication message when the processing fault is detected; and e) semaphore means, coupled to each of the first and second processing means, for providing mutually exclusive access to the shared memory means.

2. The radio communication system controller of claim 1, further comprising means for writing the input communication message to the shared memory means.

3. The radio communication system controller of claim 1, wherein the semaphore means comprises means for determining whether the input communication message is presently stored in the shared memory means.

4. The radio communication system controller of claim 1, further comprising first and second output means for providing output messages for use in the radio communication system.

5. The radio communication system controller of claim 4, further comprising means for determining which of the first and second output means is presently providing the output messages.

6. The radio communication system controller of claim 4, further comprising means for enabling each of the first and the second output means to provide the output messages.

7. The radio communication system controller of claim 1, further comprising means for providing bi-directional access to the shared memory means for at least one of the first and second processing means.

8. A fault tolerant radio communication system controller, comprising:

a) first processing means for processing an input communication message used in a radio communication system;

b) second processing means for providing substantially concurrent processing of the input communication message;

c) shared memory means, coupled to each of the first and second processing means, for storing the input communication message to produce stored communication messages;

d) transaction processor means, coupled to at least the shared memory means, for detecting a processing fault, and for selectively enabling an output message resulting from the substantially concurrent processing of the input communication message when the processing fault is detected;

e) semaphore means, coupled to each of the first and second processing means, for providing mutually exclusive access to the shared memory means; and f) output means for providing the output message for use in the radio communication system.

9. The radio communication system controller of claim 8, further comprising means for writing the input communication messages to the shared memory means.

10. The radio communication system controller of claim 8, further comprising means for determining whether the input communication message is presently stored in the shared memory means.

* * * * *